United States Patent [19]

Finberg

[11] 3,966,843

[45] June 29, 1976

[54] NONFLAMMABLE POLYSTYRENE THERMOPLASTIC COMPOSITIONS CONTAINING A BROMINATED ESTER POLYMER

[75] Inventor: Arne O. Finberg, Edison, N.J.

[73] Assignee: Mobil Oil Corporation, New York, N.Y.

[22] Filed: May 5, 1975

[21] Appl. No.: 574,212

[52] U.S. Cl.......................... 260/874; 260/DIG. 24; 526/296
[51] Int. Cl.² .......................................... C08L 25/14
[58] Field of Search......... 260/874, 78.5 T, DIG. 24

[56] References Cited
UNITED STATES PATENTS

| | | |
|---|---|---|
| 3,009,906 | 11/1961 | Eichhorn et al................ 260/78.5 T |
| 3,093,599 | 6/1963 | Tamm et al.................. 260/DIG. 24 |
| 3,711,563 | 1/1973 | Carlson et al................ 260/DIG. 24 |
| 3,721,634 | 3/1973 | Versnel.......................... 260/2.5 FP |

Primary Examiner—Carman J. Seccuro
Attorney, Agent, or Firm—Charles A. Huggett; Mitchell G. Condos; Howard M. Flournoy

[57] ABSTRACT

Brominated esters of copolymers of maleic anhydride and a compound containing ethylenic unsaturation, e.g., tribromoneopentyl ester of styrene-maleic anhydride, useful as flame retardants for polystyrene, are compatable with polystyrene and heat stable above temperatures used for processing polystyrene.

12 Claims, No Drawings

NONFLAMMABLE POLYSTYRENE THERMOPLASTIC COMPOSITIONS CONTAINING A BROMINATED ESTER POLYMER

BACKGROUND OF THE INVENTION

1. Field of the Invention

This invention relates to brominated esters of copolymers of maleic anhydride and a compound containing ethylenic unsaturation; useful as flame retardants and to nonflammable thermoplastic compositions, film or foam, e.g., molding compositions, comprising polystyrene and the brominated esters embodied herein.

2. Summary of the Prior Art

Self-extinguishing or nonflammable molding compositions are utilized to an increasing extent in many fields of application, e.g., electrical and automotive industry. It is known to use halogen containing substances as flame retardants for thermoplastic synthetic resins and that organic bromine compounds are significantly more effective than comparable chlorine containing compounds. See Thater, "Brennverhalten von Plast-formstoffen" (1968); Vogen "Flammfestmachen Von Kunststoffen" (1966).

In Canadian patent 558,230, nonflammable polystyrenes are described wherein 3–10% by weight of low substituted bromination products of alkylbenzenes of 8–10 carbon atoms, e.g., 1,2-di(dibromomethyl)benzene are utilized. However, the aforementioned compounds are so unstable chemically and thermally that they cannot be used at the usual, high processing temperatures (200°–250°C.) required in injection molding machines or extruders.

In U.S. Pat. No. 3,635,850 and German Pat. application P 1794 182.1-43, bromination products of hexamethylbenzene are proposed as flame retardants for styrene polymers, which can be employed, if desired, together with organic chlorine compounds and antimony trioxide. However, these bromination mixtures also contain, in addition to the effective compounds, substances of little or no effectiveness so that they must be employed in relatively large amounts to insure effective flame-proofness thereby unfavorably altering the good mechanical properties of the basic polymers.

U.S. Pat. No. 3,817,912 relates to nonflammable polystyrene molding compositions containing from 1-20% of a brominated polyalkyl benzene of the formula:

wherein R is bromomethyl or dibromomethyl; m is an integer from 2 to 4, inclusive; R' is alkyl of 1–3 carbon atoms, bromine or chlorine, at least one R' being ortho to each R; and n is an integer from 1 to 4 inclusive. However, the low molecular weights of these compounds tends to make them susceptible to being easily extracted by oil as well as producing a bleeding problem.

DESCRIPTION OF THE INVENTION

It has now been found that nonflammable, e.g., molding compositions of styrene polymers can be produced which do not exhibit the disadvantages detailed above provided the styrene polymers contain brominated esters of styrene-maleic anhydride copolymer according to the invention defined herein. The brominated esters of styrene-maleic anhydride disclosed are new polymeric flame retardants which have been found to be compatable with polystyrene, and thermally stable at processing temperatures (about 200°–250°C.) used for polystyrene.

The brominated esters utilized in compositions according to this invention are brominated aryl or alkyl esters of copolymers of maleic anhydride and ethylenically unsaturated compounds. Said copolymers are usually alternating copolymers which may be defined in terms of the following general structural formula:

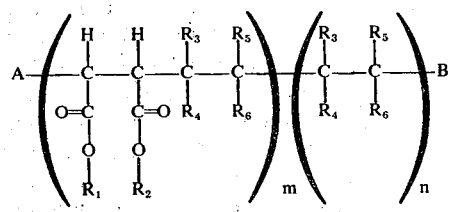

wherein $R_1$ and $R_2$ may be linear or branched alkyl partially or completely brominated, aryl partially or completely brominated benzyl or aromatic - alkyl partially or completely brominated and hydrogen; $R_3$, $R_4$, $R_5$ and $R_6$ may be H, $CH_3$, $C_2H_5$, $C_3H_9$, i.e., alkyl $C_1$–$C_{10}$ linear or branched or phenyl; and wherein A & B both may be peroxy radicals, chain transfer agents or hydrogen and $m=1$–100 and $n=0$–100. Preferred are partially or completely brominated alkyl esters ($C_1$–$C_{10}$) of copolymers of styrene-maleic anhydride.

The following is a non-exhaustive list of specific examples of suitable brominated esters. Brominated esters of styrene or α-methyl styrene-maleic acid anhydride, e.g., 2,3-dibrompropyl ester of styrene-maleic anhydride tribromoneopentyl ester of styrene-maleic anhydride, 2,3-tribromoneopentyl ester of α-methyl styrene-maleic anhydride, brominated esters of ethylene-maleic acid or anhydride, brominated esters of 2-butene maleic acid or anhydride, brominated esters of stilbene maleic acid or anhydride and brominated esters of maleic acid or anhydride and cycloolefins such as cyclopentene, cyclohexene, cycloheptene and cyclooctene, etc.

It is to be understood that the examples recited above are alternating copolymers and may be partially, or completely brominated.

Of the compounds disclosed by this invention, particularly suitable as flame retardants for polystyrene are 2,3-dibromopropyl ester of styrene-maleic anhydride and tribromoneopentyl ester of styrene-maleic anhydride.

Accordingly, the compositions embodied in this invention comprise nonflammable thermoplastic polystyrene compositions containing an amount sufficient to impart nonflammability characteristics to said compositions of a brominated alkyl ($C_1$–$C_{10}$) or aryl ($C_6$–$C_{18}$) ester of a copolymer of maleic acid or anhydride and a compound containing ethylenic unsaturation. Preferred are compositions comprising polystyrene and a brominated $C_1$–$C_{10}$ alkyl ester of an alternating copolymer of styrene-maleic anhydride.

The brominated esters of this invention can be prepared in accordance with any known or conventional method. For example, maleic anhydride may be completely dissolved in a styrene/benzene solution which is then polymerized under a nitrogen atmosphere for a period of about 12 hours. The polymers, filtered off from the resultant slurry and washed with alcohol to remove any trace of unreacted monomers, are then dried and recovered. Usually equimolar proportions of the maleic anhydride and styrene are used; also suitable polymerization catalysts may be used. The resultant copolymer is then dissolved in, for example 2,3-dibromopropanol and heated under mild conditions for approximately 3 hours. The brominated polymer is then recovered and washed with a suitable reagent, e.g., n-hexane. Any suitable brominated alcohols, phenols or cyclic compounds such as brominated cyclohexanol may be used in place of the dibromopropanol. Particularly suitable polystyrene polymers employed in the novel compositions of this invention are polystyrene, poly α-methyl-styrene and another monomer, e.g., acrylonitrile and esters of acrylic or methacrylic acid containing at least 50% styrene or α-methyl-styrene incorporated therein by polymerization. Impact-resistant styrene polymers containing elastomeric components and the so-called ABS (acrylonitrile-butadiene-styrene) polymers can also be employed. Impact-resistant styrene polymers can be obtained by mixing the styrene polymers with the elastomeric components or by grafting the styrene, optionally in a mixture with polymerizable monomers, onto the elastomeric component. It is also possible to use mixtures of impact-resistant styrene polymers.

Although molding compositions are a preferred embodiment, polystyrene film or foam in general may utilize the subject flame retardants. The flame retardants of the present invention are, however, especially suitable for the production of compact materials by extrusion or injection molding methods.

In order to produce nonflammable compositions the brominated esters may be added prior to, during or after the polymerization of the styrene copolymers. Preferably, they are added subsequent to the polymerization. The brominated flame retardants of this invention may also be added to styrene copolymers containing other ingredients such as expanding agents, blowing agents and the like.

The styrene-maleic anhydride copolymers of this invention are fully compatable with polystyrene, are thermally stable under processing temperatures used for polystyrene, and under storage conditions are substantially odorless and resistant to hydrolysis. Additionally, once incorporated into the polystyrene they are not easily extracted by oil nor are they subject to bleeding.

The self-extinguishing or flame retardant effect of the additives of this invention were evaluated in accordance with the Limiting Oxygen Index Test (LOI); see Table II, Example 5.

The following specific embodiments are merely illustrative and are not intended to limit the disclosure in any way.

EXAMPLE I

Preparation of 2,3 Dibromopropyl-Ester of α-Methyl-styrene-Maleic Anhydride Copolymer A. Preparation of α-Methyl-Styrene Maleic Anhydride Copolymer:

A 500 cc polymerization flask was charged as follows:
1. Benzene 200 ml
2. Maleic Anhydride 25.5g (0.25 mole)
3. α-Methyl-styrene 29.5g (0.25 mole)
4. AIBN (Azo-bis-iso-butyro -nitrile) .5g The AIBN was added after maleic anhydride had completely dissolved in the α-methyl-styrene-benzene solution. The polymerization was carried out under $N_2$ over a period of 12 hours. A slurry of polymer dispersed in benzene was present in the flask at this stage. The polymer was filtered off and washed with alcohol in order to remove any trace of untreated monomers. After drying a yield of 48 grams was recovered. The polymer had a reduced solution viscosity in toluene of .27. The new polymer was confirmed by comparing the I.R. Scan, of the monomers and final product; the I.R. scan of the final product showed an alternating copolymer of α-methyl-styrene maleic anhydride had been prepared.

B. Esterfication of α-methyl-styrene copolymer with 2,3 dibromopropanol

The following procedure was used:
2.16 g of polymer (0.05 mole) were dissolved in 42.2g of 2,3 dibromopropanol in a 500 cc polymerization flask. The contents of the flask were heated to about 105°–110°C for 3 hours, during which period water was distilled off. The polymer was recovered and washed with hexane. After drying a yield of 2.92 grams was obtained. The final product had a bromine content of 19% as shown in Table I. The new copolymer was found to be compatable with polystyrene giving a crystal clear blend.

EXAMPLE II

Preparation of Tribromoneopentyl Ester of Styrene-Maleic Anhydride Copolymer

Two solutions were prepared in the following manner: Solution A) Styrene-maleic anhydride copolymer (SMA-3000) (0.05 mole) 20.50 g were dissolved into 300 cc of p-xylene. Solution B) 32.40 g (.10 mole) of tribromoneopentyl alcohol were dissolved into 300 cc of p-xylene. Solutions A and B were blended together. The resultant yellow solution mixture was heated under $N_2$ reflux for 12 hours (temperature 130°–140°C). As the reactor contents cooled the polymer precipitated out into n-hexane and dried, resulting in a yield of 27.8 g.

Brominalysis of the final product gave 14% bromine. Thermal gravimetric analysis showed good thermal stability (Table I). This new copolymer was found to be compatable with polystyrene by producing clear moldings (Table I).

EXAMPLE III

Preparation of Tribromoneopentyl Ester of Styrene Maleic Anhydride Copolymer by Melt Blending 40.7 g of a styrene-maleic anhydride copolymer having a styrene-maleic anhydride ratio of 3/1 were hydrolized into the acid form. Tribromoneopentyl alcohol 0.2 mole (65 g) was heated to approximately 110°C. under nitrogen. The polymer hydrolized above, was added slowly to the alcohol forming a very viscous solution which was heated to about 130°C. for 12 hrs. to allow water present to be distilled off. During this period the viscosity of the solution increased from a viscous solution to an elastic solid. After 12 hrs. the polymer was cooled to room temperature and dissolved in 100 cc of toluene, precipitated into 1 liter of pentane and washed with additional amounts of pentane in order to remove any trace of alcohol. After drying a yield of 102.8 grams was recovered.

Bromine analysis confirmed a bromine content of 45%. Thermogravimetric analysis showed no trace of the alcohol left which boils at 125°–130°C. The results in Table I show that esterified polymer prepared through direct esterification in the melt has identical stability to the product prepared in solution. This example also demonstrates that the subject polymer can be prepared directly in a vented extruder.

EXAMPLE IV

PREPARATION OF TRIBROMONEOPENTYL ESTER OF ETHYLENE-MALEIC ANHYDRIDE COPOLYMER

Procedure: 32.48 (0.1 mole) of tribromoneopentyl alcohol were transferred to a polymerization flask equipped with condenser and water trap. The flask was heated up to about 110°C liquifying the tribromoneopentyl alcohol, (M.P. 69°C.), 0.1 mole of (EMA-31- commercially available) ethylenemaleic anhydride 1:1 copolymer was dissolved in the alcohol; the temperature was maintained at about 110°–120°C over a period of approximately 4 hrs. During stirring, a viscous to elastic solid was formed in the flask. The flask contents were then dispersed into ethanol, and filtered off finally being washed with more ethanol and dried in a vacuum oven overnight. The final product was recovered and identified by standard techniques as tribromoneopentyl ester of ethylene-maleic anhydride.

EXAMPLE V

OXYGEN INDEX EVALUATION OF POLYBLEND OF POLYSTYRENE AND TRIBROMONEOPENTYL ESTER OF SMA RESIN

A melt blend of polystyrene (Dow-685) with 20% by weight of the polymer of Example III was prepared on the Brabender Plastograph; standard ⅛ × ½ × 5 in. bars were molded and evaluated according to ASTM-D-2863-74 for limiting oxygen index value. A blend of SMA 3,000 and polystyrene, 15/85 parts respectively, such as Sample No. 2, Table 2, showed that such resins do not act as flame retardants, said sample gave a L.O.I. of only 0.214 which is on the borderline between flammability and non-flammability. A non-flammable material will have an L.O.I. index of at least 0.22. Results in Table 2 show that our polymers are very effective polymeric flame retardants for polystyrene. A value of 0.27 means completely self-extinguishing plastic.

TABLE 2

| SAMPLE | POLYSTYRENE (DOW-685) % by wt. | ADDITIVE RESIN | % BY WT. | LIMITING OXYGEN INDEX × $10^{-2}$ |
| --- | --- | --- | --- | --- |
| 1 Polystyrene | 100 | — | — | 19.8 |
| 2 | 85 | SMA-3000 | 15 | 21.4 |
| 3 | 80 | Example 3 | 20 | 29.8 |

The preceeding examples thus illustrate the essence of this invention, i.e. brominated esters of styrene-maleic anhydride copolymers useful as flame retardants and nonflammable thermoplastic polystyrene compositions, e.g., molding compositions, containing an amount sufficient to impart nonflammability characteristics to said polystyrene of brominated $C_1$–$C_{10}$ alkyl ester of styrene-maleic anhydride copolymer, having a bromine content of from about 0.5–60 wt. % based on the ester; and a process for forming a nonflammable thermoplastic molding composition containing said esters of styrene-maleic anhydride copolymer.

It is to be understood that the present invention can be modified by one of ordinary skill in the art without departing from the spirit and the scope of the invention as disclosed herein and thus adapted to various apparent uses as conditions permit.

What is claimed is:

1. A nonflammable thermoplastic polystyrene composition containing an amount sufficient to impart nonflammability characteristics to said composition of a

TABLE 1

PROPERTIES OF NOVEL BROMINATED ALKYL ESTERS DISCLOSED HEREIN AND SMA-RESIN

| SAMPLE | ESTER-TYPE | Br% (X-RAY) | TGA,[3] °C $T_{5\%}$ | $T_{50\%}$ | Compression[1] Moldings 10/90 wgt. ratio | XP PS |
| --- | --- | --- | --- | --- | --- | --- |
| Example I (α-methyl SMA) | 2,3-dibromopropyl | 19 | 225 | 349 | Clear | |
| Example II (SMA) | tribromoneopentyl | 14 | 270 | 385 | Clear | |
| Example III (SMA) | tribromoneopentyl | 45 | 270 | 385 | Clear | |
| SMA-3000[2] | — | — | — | — | Hazy | |

[1]Melt blended on Brabender Plastograph and pressed into 12–15 mil. plaques
[2]A low molecular weight (1900) unmodified copolymer of styrene and maleic anhydride, melting from 115–130°C, with a viscosity of 52 centipoises at 25°C., commercially available from Polymer Synthesis, Petro Chemicals Division, Sinclair Research, Inc.
[3]Thermal Gravametric Analysis brominated alkyl or aryl ester of a copolymer of maleic acid or anhydride and a compound containing ethylenic unsaturation.

2. The composition of claim 1 wherein the brominated ester is a $C_6$–$C_{18}$ aryl ester.

3. The composition of claim 1 wherein the brominated ester is a $C_1$–$C_{10}$ alkyl ester.

4. The composition of claim 3 wherein the nonflammable thermoplastic composition comprises polystyrene and a brominated $C_1$–$C_{10}$ alkyl ester of a copolymer of styrenemaleic anhydride.

5. The composition of claim 4 containing about 20 wt. % based on the total weight of the composition, of brominated ester as described therein.

6. The composition of claim 4 wherein the ester is tribromoneopentyl ester of styrene-maleic anhydride copolymer having a bromine content of from about 0.5–60 wt. % based on the ester.

7. The composition of claim 4 wherein the ester is 2,3-tribromoneopentyl ester of α-methyl-styrene-maleic anhydride.

8. The composition of claim 6 wherein said bromine content is about 19 wt. %.

9. The composition of claim 6 wherein said bromine content is about 45 wt. %.

10. The composition of claim 1 comprising a polystyrene molding composition.

11. A process for forming a nonflammable thermoplastic polystyrene composition according to claim 1 comprising intimately admixing a melt blend of said polystyrene with from about 1–30 wt. %, based on the total weight of the composition, of a brominated alkyl or aryl ester of a copolymer of maleic acid or anhydride and a compound containing ethylenic unsaturation.

12. A process for forming a nonflammable thermoplastic composition according to claim 4 comprising intimately admixing a melt blend of polystyrene with from about 1–30 wt. %, based on the total weight of the composition, of a brominated $C_1$–$C_{10}$ alkyl ester of styrene-maleic anhydride copolymer.

* * * * *